(12) United States Patent
Coleman et al.

(10) Patent No.: US 10,964,967 B2
(45) Date of Patent: Mar. 30, 2021

(54) PROCESS FOR THE RECOVERY OF IONOMER

(71) Applicant: JOHNSON MATTHEY FUEL CELLS LIMITED, London (GB)

(72) Inventors: Robert Jeffrey Coleman, Swindon (GB); Thomas Robertson Ralph, Swindon (GB); Sam Haig, Bramhall (GB); Natalia V. Plechkova, Belfast (GB)

(73) Assignee: Johnson Matthey Fuel Cells Limited, London (GB)

( * ) Notice: Subject to any disclaimer, the term of this patent is extended or adjusted under 35 U.S.C. 154(b) by 296 days.

(21) Appl. No.: 15/561,728

(22) PCT Filed: Mar. 24, 2016

(86) PCT No.: PCT/GB2016/050850
§ 371 (c)(1),
(2) Date: Sep. 26, 2017

(87) PCT Pub. No.: WO2016/156815
PCT Pub. Date: Oct. 6, 2016

(65) Prior Publication Data
US 2018/0108932 A1    Apr. 19, 2018

(30) Foreign Application Priority Data
Mar. 27, 2015 (GB) .................................... 1505311

(51) Int. Cl.
| | |
|---|---|
| H01M 8/008 | (2016.01) |
| H01M 8/1069 | (2016.01) |
| H01M 8/24 | (2016.01) |
| C08J 3/09 | (2006.01) |
| C08J 5/22 | (2006.01) |
| H01M 8/1081 | (2016.01) |
| H01M 8/1039 | (2016.01) |

(52) U.S. Cl.
CPC ............... *H01M 8/24* (2013.01); *C08J 3/095* (2013.01); *C08J 5/2237* (2013.01); *H01M 8/008* (2013.01);
(Continued)

(58) Field of Classification Search
CPC .... H01M 8/24; H01M 8/1081; H01M 8/1069; H01M 8/1039; H01M 8/008;
(Continued)

(56) References Cited

U.S. PATENT DOCUMENTS

| | | |
|---|---|---|
| 8,932,782 B2 | 1/2015 | Sahu et al. |
| 2005/0211630 A1 | 9/2005 | Grot et al. |

(Continued)

FOREIGN PATENT DOCUMENTS

| | | |
|---|---|---|
| CN | 102875940 A | 1/2013 |
| DE | 102012109063 A1 | 3/2013 |

(Continued)

OTHER PUBLICATIONS

GB1505311.9, Search Report under Section 17 dated Sep. 29, 2015.

*Primary Examiner* — Stewart A Fraser
(74) *Attorney, Agent, or Firm* — BakerHostetler

(57) ABSTRACT

A process for the recovery of a perfluorosulphonic acid ionomer from a component comprising a perfluorosulphonic acid ionomer is disclosed, the process comprising immersing the component comprising the perfluorosulphonic acid ionomer in a solvent comprising an aliphatic diol and heating. Also disclosed is the use of the recovered perfluorosulphonic acid ionomer, for example in to prepared a proton conducting membrane or a catalyst ink.

9 Claims, 2 Drawing Sheets

Solid state NMR spectra for as received 920EW PFSA membrane and for the ionomer from the same membrane after dispersion of the membrane in ethylene glycol solvent.

(52) U.S. Cl.
CPC ....... *H01M 8/1039* (2013.01); *H01M 8/1069* (2013.01); *H01M 8/1081* (2013.01); *C08J 2300/30* (2013.01); *C08J 2327/12* (2013.01); *Y02P 70/50* (2015.11); *Y02W 30/84* (2015.05)

(58) Field of Classification Search
CPC ...... C08J 5/2237; C08J 3/095; C08J 2327/12; C08J 2300/30; Y02W 30/86; Y02P 70/56
See application file for complete search history.

(56) References Cited

U.S. PATENT DOCUMENTS

| | | | |
|---|---|---|---|
| 2007/0292745 A1* | 12/2007 | Shore | H01M 8/008 429/49 |
| 2010/0237278 A1 | 9/2010 | Kim et al. | |
| 2011/0266491 A1 | 11/2011 | Kim et al. | |

FOREIGN PATENT DOCUMENTS

| | | |
|---|---|---|
| EP | 0631337 A2 | 12/1994 |
| JP | 2004171921 A | 6/2004 |
| JP | 2005235504 A | 9/2005 |
| JP | 2012520921 A | 9/2012 |
| JP | S6197336 | 9/2012 |
| WO | WO2000024074 | 4/2000 |
| WO | 2001092383 | 12/2001 |
| WO | WO2006115684 A1 | 11/2006 |
| WO | WO2007149904 A1 | 12/2007 |
| WO | WO2013144631 A1 | 10/2013 |

* cited by examiner

Figure 1: Solid state NMR spectra for as received 920EW PFSA membrane and for the ionomer from the same membrane after dispersion of the membrane in ethylene glycol solvent.
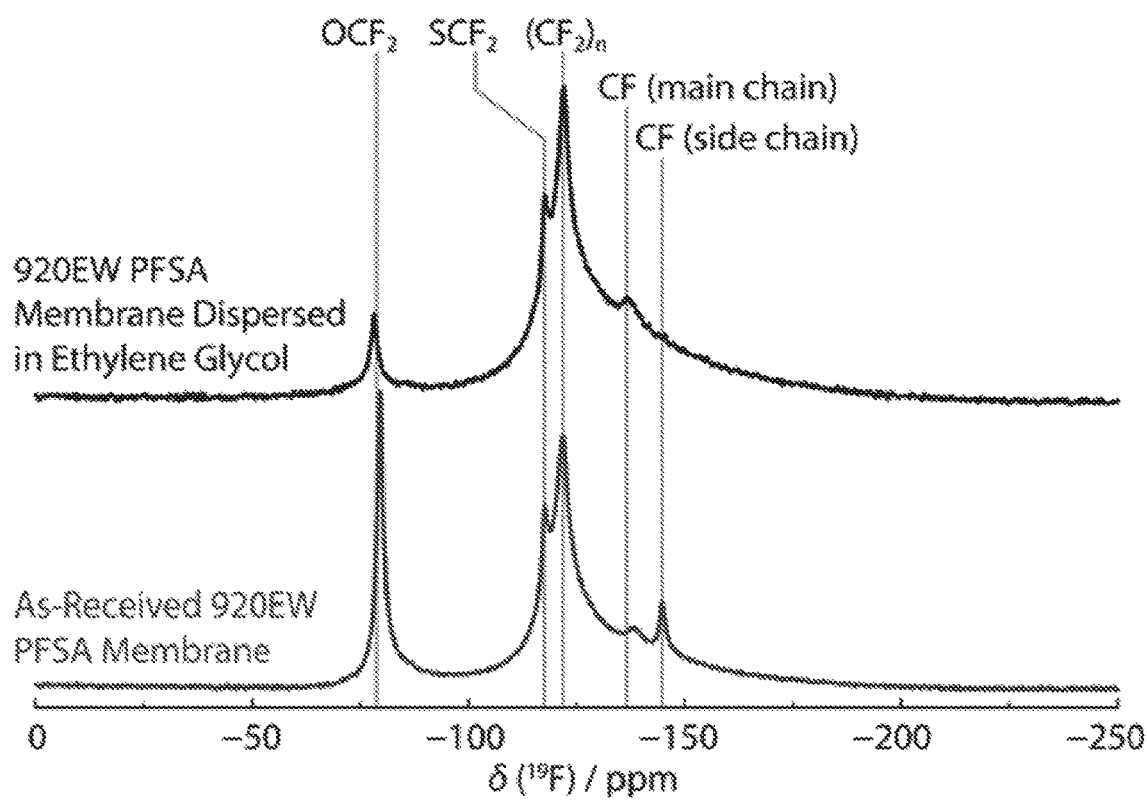

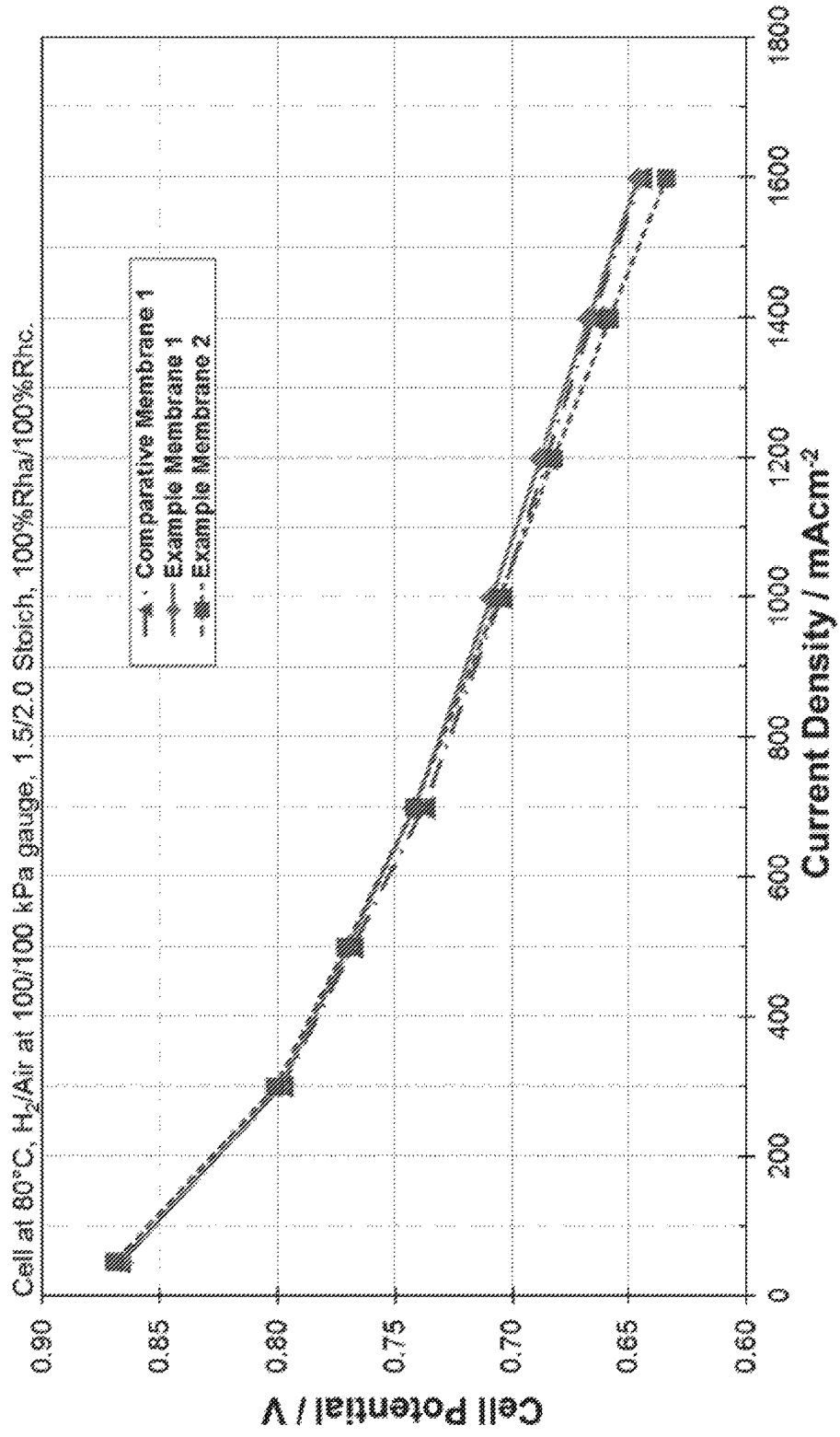
Figure 2: Beginning of Life performance plot comparing MEAs fabricated with membranes made from 100% virgin 790EW PFSA ionomer, and 10% and 20% blends of recovered 790EW ionomer.

PROCESS FOR THE RECOVERY OF IONOMER

CROSS-REFERENCE TO RELATED APPLICATIONS

This application is the National Stage of International Patent Application No. PCT/GB2016/050850 filed Mar. 24, 2016, which claims priority from Great Britain Patent Application No. 1505311.9 filed Mar. 27, 2015, the disclosures of each of which are incorporated herein by reference in their entirety.

FIELD OF THE INVENTION

The present invention relates to a process for the recovery of ionomer material from used or unused fuel cell components and a dispersion comprising recovered ionomer obtained by that process. The invention further relates to the subsequent use of the dispersion, such as for preparing a proton conducting membrane or catalyst ink.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) (which also includes the direct methanol fuel cell (DMFC)) the membrane is proton conducting, and protons, produced at the anode, are transported across the membrane to the cathode, where they combine with oxygen to form water.

A principal component of the PEMFC is the membrane electrode assembly (MEA), which is essentially composed of five layers. The central layer is the proton conducting membrane. On either side of the proton conducting membrane there is an electrocatalyst layer, containing an electrocatalyst designed for the specific electrolytic reaction. Finally, adjacent to each electrocatalyst layer there is a gas diffusion layer (GDL). The GDL must allow the reactants to reach the electrocatalyst layer and must conduct the electric current that is generated by the electrochemical reactions. Therefore, the GDL must be porous and electrically conducting.

The electrocatalyst layers generally comprise an electrocatalyst comprising a metal or an alloy suitable for the fuel oxidation or oxygen reduction reaction, depending on whether the layer is to be used at the anode or cathode. The electrocatalyst is typically based on platinum or platinum alloyed with one or more other metals. The platinum or platinum alloy catalyst can be in the form of unsupported nanoparticles (such as metal blacks or other unsupported particulate metal powders), or can be deposited as higher surface area particles onto a conductive carbon substrate or other conductive material (a supported catalyst), or can also be in the form of an extended thin film material, such as those disclosed in, for example, WO2013/144631A1.

The electrocatalyst layers also generally comprise a proton conducting material, such as a proton conducting ionomer, to aid transfer of protons from the anode catalyst to the membrane and from the membrane to the cathode catalyst.

Conventional proton conducting membranes used in PEMFCs are generally formed from perfluorinated sulphonic acid (PFSA) ionomers and the membranes formed from these ionomers are sold under the trade names Nafion® (DuPont), Aquivion® (Solvay Specialty Polymers), Flemion® (Asahi Glass KK) and Aciplex® (Asahi Kasei). Alternatively, the proton conducting membrane may be based on a sulphonated hydrocarbon membrane such as those available from FuMA-Tech GmbH as the fumapem® P, E or K series of products, JSR Corporation, Toyobo Corporation, and others.

The proton conducting membrane may be a composite membrane, wherein the membrane contains other materials that confer properties such as mechanical strength. For example, the membrane may contain a porous reinforcing material, such as an expanded polytetrafluoroethylene (e-PTFE) material.

The proton conducting membrane may also comprise one or more components which assist the chemical durability of the membrane, for example a hydrogen peroxide decomposition catalyst, a radical scavenger etc.

Conventionally, the MEA can be constructed by a number of methods outlined hereinafter:

(i) The electrocatalyst layer may be applied to the GDL to form a gas diffusion electrode (GDE). A GDE is placed on each side of an ion-conducting membrane and laminated together to form the five-layer MEA;

(ii) The electrocatalyst layer may be applied to both faces of the proton conducting membrane to form a catalyst coated membrane (CCM). Subsequently, a GDL is applied to each face of the CCM.

(iii) An MEA can be formed from an ion-conducting membrane coated on one side with an electrocatalyst layer, a GDL adjacent to that electrocatalyst layer, and a GDE on the other side of the proton conducting membrane.

Typically, tens or hundreds of MEAs are required to provide enough power for most applications, so multiple MEAs are assembled to make up a fuel cell stack. Field flow plates are used to separate the MEAs. The plates perform several functions: supplying the reactants to the MEAs; removing products; providing electrical connections; and providing physical support.

SUMMARY OF THE INVENTION

The cost of the materials that make up the key components of an MEA is one factor that is impacting on the widespread uptake of fuel cell technology, especially in the automotive area. In particular, the cost of the precious metal catalyst and the proton conducting membrane components contributes a large percentage of the overall costs of the MEA, which itself is a major cost component of the fuel cell stack. Separation, recovery and re-use of one or both of these components would mitigate some of the cost issues and would also address environmental considerations around the extraction of the raw materials going into these components and their current end-of-life disposal processes.

Furthermore, increasingly tight legislation is being enacted that requires car companies to recycle or recover an increasing amount of the original vehicle weight. For example, the European End-of-Life Vehicles Directive has a target of 95% recovery and re-use by 2015.

Much attention has focussed on the recovery and recycling of the precious metal catalyst from a used fuel cell, but there has been little focus on recovery of other materials used in a fuel cell, in particular the expensive PFSA ionomer that is the major constituent of the membrane and is also employed in the catalyst layers.

The object of the present invention is to provide a process for the recovery of high value material, specifically PFSA ionomer, from fuel cell components. In particular, it is the object to provide an economically viable process for the recovery of high value material, specifically PFSA ionomer, from fuel cell components.

The invention provides a process for the recovery of perfluorosulphonic acid ionomer from a component comprising a perfluorosulphonic acid ionomer, said process comprising the steps:

(i) immersing the component comprising a perfluorosulphonic acid ionomer in a solvent comprising a $C_{1-8}$ aliphatic diol compound, wherein said diol compound comprises at least one —$CH_2OH$ group; and (ii) heating the component/solvent mix to a temperature of up to 230° C. to obtain a dispersion comprising solvent and perfluorosulphonic acid ionomer.

The invention further provides a dispersion comprising perfluorosulphonic acid ionomer and a solvent comprising a $C_{1-8}$ aliphatic diol compound, wherein said diol compound comprises at least one —$CH_2OH$ group.

The invention further provides a dispersion comprising perfluorosulphonic acid ionomer and a solvent comprising a $C_{1-8}$ aliphatic diol compound, wherein said diol compound comprises at least one —$CH_2OH$ group, wherein said dispersion is obtainable by a process comprising the steps:

(i) immersing a component comprising a perfluorosulphonic acid ionomer in a solvent comprising a $C_{1-8}$ aliphatic diol compound, wherein said diol compound comprises at least one —$CH_2OH$ group; and (ii) heating the component solvent mix to a temperature of up to 230° C. to obtain the dispersion comprising perfluorosulphonic acid ionomer and a solvent comprising a $C_{1-8}$ aliphatic diol compound, wherein said diol compound comprises at least one —$CH_2OH$ group.

The invention further provides a proton conducting membrane, wherein said proton conducting membrane is prepared from a dispersion comprising perfluorosulphonic acid ionomer and a solvent comprising a aliphatic diol compound, wherein said diol compound comprises at least one —$CH_2OH$ group.

The invention further provides a proton conducting membrane, wherein said proton conducting membrane is prepared from a dispersion comprising perfluorosulphonic acid ionomer and a solvent comprising a $C_{1-8}$ aliphatic diol compound, wherein said diol compound comprises at least one —$CH_2OH$ group, wherein said dispersion is obtainable by a process comprising the steps:

(i) immersing a component comprising a perfluorosulphonic acid ionomer in a solvent comprising a $C_{1-8}$ aliphatic diol compound, wherein said diol compound comprises at least one —$CH_2OH$ group; and (ii) heating the component/solvent mix to a temperature of up to 230° C. to obtain the dispersion comprising perfluorosulphonic acid ionomer and a solvent comprising a $C_{1-8}$ aliphatic diol compound, wherein said diol compound comprises at least one —$CH_2OH$ group.

The invention further provides the use of a dispersion for preparing a proton conducting membrane, wherein said dispersion comprises perfluorosulphonic acid ionomer and a solvent comprising a $C_{1-8}$ aliphatic diol compound, wherein said diol compound comprises at least one —$CH_2OH$ group.

The invention further provides the use of a dispersion for preparing a proton conducting membrane, wherein said dispersion comprises perfluorosulphonic acid ionomer and a solvent comprising a $C_{1-8}$ aliphatic diol compound, wherein said diol compound comprises at least one —$CH_2OH$ group, and wherein said dispersion is obtainable by a process comprising the steps:

(i) immersing a component comprising a perfluorosulphonic acid ionomer in a solvent comprising a $C_{1-8}$ aliphatic diol compound, wherein said diol compound comprises at least one —$CH_2OH$ group; and (ii) heating the component/solvent mix to a temperature of up to 230° C. to obtain the dispersion comprising perfluorosulphonic acid ionomer and a solvent comprising a $C_{1-8}$ aliphatic diol compound, wherein said diol compound comprises at least one —$CH_2OH$ group.

The invention further provides a catalyst ink comprising a catalyst component and a dispersion comprising perfluorosulphonic acid ionomer and a solvent comprising a $C_{1-8}$ aliphatic diol compound, wherein said diol compound comprises at least one —$CH_2OH$ group.

The invention further provides a catalyst ink comprising a catalyst component and a dispersion comprising perfluorosulphonic acid ionomer and a solvent comprising a $C_{1-8}$ aliphatic diol compound, wherein said diol compound comprises at least one —$CH_2OH$ group, wherein said dispersion is obtainable by a process comprising the steps:

(i) immersing a component comprising a perfluorosulphonic acid ionomer in a solvent comprising a $C_{1-8}$ aliphatic diol compound, wherein said diol compound comprises at least one —$CH_2OH$ group; and (ii) heating the component/solvent mix to a temperature of up to 230° C. to obtain the dispersion comprising perfluorosulphonic acid ionomer and a solvent comprising a $C_{1-8}$ aliphatic diol compound, wherein said diol compound comprises at least one —$CH_2OH$ group.

The invention further provides the use of a dispersion for preparing a catalyst ink, wherein said dispersion comprises perfluorosulphonic acid ionomer and a solvent comprising a $C_{1-8}$ aliphatic diol compound, wherein said diol compound comprises at least one —$CH_2OH$ group.

The invention further provides the use of a dispersion for preparing a catalyst ink, wherein said dispersion comprises perfluorosulphonic acid ionomer and a solvent comprising a $C_{1-8}$ aliphatic diol compound, wherein said diol compound comprises at least one —$CH_2OH$ group, and wherein said dispersion is obtainable by a process comprising the steps:

(i) immersing a component comprising a perfluorosulphonic acid ionomer in a solvent comprising a $C_{1-8}$ aliphatic diol compound, wherein said diol compound comprises at least one —$CH_2OH$ group; and (ii) heating the component/solvent mix to a temperature of up to 230° C. to obtain the dispersion comprising perfluorosulphonic acid ionomer and a solvent comprising a $C_{1-8}$ aliphatic diol compound, wherein said diol compound comprises at least one —$CH_2OH$ group.

The invention further provides a process for separating a membrane electrode assembly into components, said process comprising:

(i) immersing the membrane electrode assembly in a solvent comprising a $C_{1-8}$ aliphatic diol compound, wherein said diol compound comprises at least one —$CH_2OH$ group; and (ii) heating the membrane electrode assembly/solvent mix to a temperature of up to 230° C. to effect separation of the membrane electrode assembly components.

The invention further provides a process for the recovery of one or more catalyst components from an original component selected from the group consisting of a perfluorosulphonic acid membrane, a catalyst coated membrane, an electrode and a membrane electrode assembly, said process comprising:

(i) immersing the original component in a solvent comprising a $C_{1-8}$ aliphatic diol compound, wherein said diol compound comprises at least one —$CH_2OH$ group; and (ii) heating the component/solvent mix to a temperature of up to 230° C. to obtain a dispersion comprising solvent and the one or more catalyst components; and (iii) filtering the dispersion to separate the solvent and the one or more PFSA ionomers from the one or more catalyst components.

BRIEF DESCRIPTION OF THE DRAWINGS

FIG. 1 shows solid state NMR spectra for an "as received" PFSA membrane, with an ionomer equivalent weight (EW) of 920 (920 EW), and for a dispersion of the ionomer from the same membrane following process trials performed according to the invention.

FIG. 2 shows the Beginning of Life (BoL) performance plot for MEAs fabricated with membranes made using recovered 790 EW ionomer.

DETAILED DESCRIPTION OF THE INVENTION

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

The present invention provides a process for the recovery of PFSA ionomer from a fuel cell component comprising a PFSA ionomer.

The PFSA ionomer suitably has an equivalent weight (EW) of less than or equal to 1100, such as less than 950, such as less than 850. The perfluorosulphonic acid ionomer suitably has a minimum EW of 600. The EW is defined as the weight of ionomer (in terms of molecular mass) per sulphonic acid group, expressed in units of $geq^{-1}$.

The PFSA ionomer is typically a material such as Nafion® (DuPont), Aquivion® (Solvay Specialty Polymers), Flemion® (Asahi Glass KK) and Aciplex® (Asahi Kasei). These materials are relatively expensive and the cost thereof contributes considerably to the overall cost of the fuel cell. Thus it would be beneficial to be able to recover the PFSA ionomer material from used or unused fuel cells or MEAs or from unused proton conducting membrane material and to re-use the recovered ionomer material.

The component comprising a PFSA ionomer may be 'used' or 'unused'. By 'used' is meant the component has been incorporated into a cell (either in a single cell or as part of a stack) and has been subjected to electrochemical operation. By 'unused' is meant the component may have been incorporated into a cell, but has not been subjected to any electrochemical operation or the component was removed during or after the manufacturing process due to quality control criteria or damage.

The component comprising a PFSA ionomer may be a PFSA membrane. The PFSA membrane may be used or unused.

The membrane in a PEMFC is typically formed from a PFSA ionomer material such as Nafion® (DuPont), Aquivion® (Solvay Specialty Polymers), Flemion® (Asahi Glass KK) and Aciplex® (Asahi Kasei).

The PFSA membrane may be a composite membrane, wherein the membrane contains other materials that confer properties such as mechanical strength. For example, the membrane may contain a porous reinforcing material, such as an e-PTFE material.

The PFSA membrane may comprise one or more hydrogen peroxide decomposition catalysts either as a layer on one or both faces of the membrane or embedded within the membrane. Examples of the hydrogen peroxide decomposition catalyst suitable for use are known to those skilled in the art and include metal oxides, such as cerium oxides, manganese oxides, titanium oxides, beryllium oxides, bismuth oxides, tantalum oxides, niobium oxides, hafnium oxides, vanadium oxides and lanthanum oxides; suitably cerium oxides, manganese oxides or titanium oxides; preferably cerium dioxide (ceria).

The PFSA membrane may optionally comprise a recombination catalyst, in particular a catalyst for the recombination of unreacted $H_2$ and $O_2$, which can diffuse into the membrane from the anode and cathode respectively, to produce water. Suitable recombination catalysts comprise a metal (such as platinum) on a high surface area oxide support material (such as silica, titania, zirconia). More examples of recombination catalysts are disclosed in EP0631337 and WO00/24074.

Alternatively, the component comprising a PFSA ionomer is a CCM (either used or unused). The CCM comprises a PFSA membrane (as hereinbefore described) and one or more catalyst layers. Each catalyst layer comprises at least one catalyst component and at least one PFSA ionomer. If two or more catalyst layers are present, the catalyst layers may be on the same face or opposite faces of the PFSA membrane.

The one or more catalyst layers each comprise one or more catalyst components selected to facilitate a given electrochemical reaction: the hydrogen oxidation reaction; the oxygen reduction reaction; oxygen evolution reaction etc. Examples of catalysts suitable for use are known to and form part of the common general knowledge of a person skilled in the art. For example, the hydrogen oxidation reaction catalyst and oxygen reduction reaction catalyst comprises a primary metal, selected from the platinum group metals, gold, silver or a base metal or an alloy or mixture comprising one or more of these metals of their oxides. The metal, alloy or mixture may be in the form of nanoparticulates, either unsupported or supported, for example on a carbon support material; or may be in the form of an extended thin film material.

The PFSA ionomer in the one or more catalyst layers may be the same as or different to the PFSA ionomer from which the PFSA membrane is formed. If two or more catalyst layers are present, the PFSA ionomer in each catalyst layer may be the same or different to the PFSA ionomer in the other, or each other, catalyst layer. Suitably, the PFSA ionomer is the same throughout the CCM.

Alternatively, the component comprising a PFSA ionomer is a MEA (either used or unused); the MEA comprises a PFSA membrane, one or more catalyst layers and one or two GDLs. The PFSA membrane and catalyst layers are as described hereinabove. The one or more GDLs are typically based on conventional non-woven or woven carbon fibre gas diffusion substrates which may have been modified with a hydrophobic polymer treatment and/or application of a microporous layer comprising particulate material either embedded within the substrate or coated onto the planar faces, or a combination of both, to form the gas diffusion layer. The particulate material is typically a mixture of carbon black and a polymer such as polytetrafluoroethylene (PTFE).

Alternatively, the component comprising a PFSA ionomer may be an electrode comprising a GDL and one or more catalyst layers applied to one face of the GDL. The one or more catalyst layers and GDL are as hereinbefore described.

The component comprising a PFSA ionomer may have a seal component present on one or both faces around the periphery of the component.

In the process of the invention, the component comprising a PFSA ionomer is immersed in a solvent (step (i)).

The component comprising a PFSA ionomer may be immersed in the solvent whole, or may be chopped or shredded prior to being immersed in the solvent.

If a seal component is present on one or both faces of the component comprising a PFSA ionomer, the seal component is suitably removed (for example by being cut away) prior to the component comprising a PFSA ionomer being immersed in the solvent.

The solvent comprises a $C_{1-8}$ aliphatic diol compound wherein said diol compound comprises at least one —$CH_2OH$ group. Suitably, the solvent comprises a $C_{1-5}$ aliphatic diol compound wherein said diol compound comprises at least one —$CH_2OH$ group.

The diol compound may comprise a —$CH(OH)CH_2OH$ group. Specific examples include, but are not limited to: ethylene glycol (ethane-1,2-diol), propylene glycol (propane-1,2-diol) and 1,2-butanediol (butane-1,2-diol).

In one embodiment, the solvent comprises ethylene glycol.

Alternatively, the diol compound may comprise two —$CH_2OH$ groups. Specific examples include, but are not limited to: ethylene glycol (ethane-1,2-diol), 1,3-propanediol, 1,4-butanediol and 1,5-pentanediol.

In addition to the $C_{1-8}$ diol compound, the solvent may also comprise a co-solvent. The co-solvent may be any solvent which is soluble in, or miscible with, the diol. The co-solvent may be water. Alternatively, the co-solvent may be a $C_{1-4}$ alcohol, for example ethanol or propan-1-ol. Alternatively, the co-solvent may be a mixture of more than one solvent, such as water and propan-1-ol. The co-solvent is suitably present at up to 90%, preferably 50%, more preferably 20% by volume of the solvent (i.e. diol+co-solvent).

The component comprising a PFSA ionomer/solvent mix is heated to a temperature of up to 230° C., suitably 150° C. (step (ii)).

In one embodiment, the component comprising a PFSA ionomer /solvent mix is heated to a temperature of 90° C. to 150° C., such as 90° C. to 120° C.

Suitably, the temperature used is below the boiling point of the solvent, and ideally below the flash point of the solvent.

Heating is carried out by means known to those skilled in the art and will depend on the scale of the process being used.

The process can be carried out at no or any applied pressure. With solvent types identified in the invention, which have relatively high boiling points and flash points, the invention can suitably be carried out at a low applied pressure, such as up to 5 bar gauge, and even more suitably with no applied pressure, i.e. 0 bar gauge (ambient pressure).

The component comprising a PFSA ionomer is suitably immersed in the solvent for up to 24 hours, for example up to 3 hours. Suitably, the minimum time of immersion is 15 minutes.

The process described above may comprise an additional step (iii):

(iii) immersion of additional component comprising a PFSA ionomer in the dispersion obtained in step (ii) and subjecting the component comprising a PFSA ionomer/solvent mix to a temperature of up to 230° C.

Additional solvent may be added as required, either before, concurrent with or subsequent to the additional component comprising a PFSA ionomer.

This additional step (iii) may be repeated a number of times as required (such as up to 20 times). It will be appreciated by the skilled person that when step (iii) is repeated, the additional component comprising a PFSA ionomer is added to the dispersion obtained at the end of the previous step (iii).

It will also be appreciated that the PFSA ionomer content of the dispersion obtained as a result of each additional step (iii) will increase compared to the PFSA ionomer content of the dispersion obtained as a result of the previous additional step (iii) if no addition solvent is added. The maximum PFSA ionomer content is suitably up to 25% wt/wt.

If the component comprising a PFSA ionomer is a PFSA membrane comprising a porous reinforcing material, immersion of the component in the solvent and heating will result in the porous reinforcing material becoming separate from the PFSA ionomer of the component. The dispersion will thus also contain the porous reinforcing material, which remains largely as a solid material and can be removed from the dispersion subsequent to step (ii) and/or step (iii). Removal of the porous reinforcing material can be by conventional means, such as filtration or centrifugation.

If the component comprising a PFSA ionomer is a PFSA membrane comprising one or more hydrogen peroxide decomposition catalysts and/or one or more recombination catalysts, these catalysts will become dispersed in the solvent upon heating. The one or more hydrogen peroxide decomposition catalysts and/or one or more recombination catalysts largely remain as solid particulate materials and can be removed from the dispersion subsequent to step (ii) and/or step (iii). Removal of the one or more catalyst component can be by conventional means, such as filtration or centrifugation.

If the component comprising a PFSA ionomer is a CCM, immersion of the component in the solvent and heating will result in disintegration of the one or more catalyst layers. The PFSA ionomer in the catalyst layer will become dispersed in the solvent, together with the PFSA ionomer from the PFSA membrane. The one or more catalyst components from the one or more catalyst layers will also become dispersed in the solvent. The one or more catalyst components largely remain as solid particulate materials and can be removed from the dispersion subsequent to step (ii) and/or step (iii). Removal of the one or more catalyst component can be by conventional means, such as filtration or centrifugation.

If the component comprising a PFSA ionomer is a MEA, immersion of the component in the solvent and heating will result in disintegration of the one or more catalyst layers and also separation of the one or two GDLs. Disintegration of the one or more catalyst layers is as described above. The GDLs may remain intact and can subsequently be removed from the dispersion. Alternatively, the one or two GDLs may disintegrate to leave solid carbon fibres and/or solid carbon particulate material present in the dispersion. These carbon fibres and particulates may be removed from the dispersion subsequent to step (ii) and/or step (iii). Removal of the carbon fibres and particulates can be by conventional means, such as filtration or centrifugation.

The dispersion obtained from the process of the present invention comprises PFSA ionomer in a solvent comprising a $C_{1-8}$ aliphatic diol compound, wherein said diol compound comprises at least one —$CH_2OH$ group.

The dispersion suitably has a PFSA ionomer content of up to 25% wt/wt.

In the context of the present invention, PFSA ionomer obtained as a result of the invention process will be referred to as 'recovered' ionomer or PFSA ionomer. PFSA ionomer which has not been subjected to any recovery process will be referred to as 'virgin' or 'non-recovered' ionomer or PFSA ionomer.

The dispersion obtained from the invention process can be used to prepare a new proton conducting membrane. The proton conducting membrane is prepared using conventional methods known to those skilled in the art, for example using a casting method. The proton conducting membrane may be fabricated by casting the dispersion onto a removable support material (e.g. a polymer backing film) or may be formed by casting the dispersion directly onto a functional component of the MEA (e.g. a gas diffusion electrode).

The dispersion obtained from the invention process can also be blended with a dispersion of virgin PFSA ionomer (either in the same or a different solvent) before casting the membrane. Suitably, the blended dispersion used to prepare the proton conducting membrane comprises, on a wt/wt basis of the ionomer constituents, from 5% to 99%, suitably from 5% to 40%, suitably from 5% to 25% of recovered PFSA ionomer in the total ionomer mass.

The proton conducting membrane prepared using the dispersion obtained from the invention process may also comprise a porous reinforcing material, for example an e-PTFE porous film material. The porous reinforcing material may be incorporated into the membrane by methods known to those skilled in the art.

The dispersion obtained from the process of the present invention can also be used to prepare a catalyst ink comprising a catalyst component and the dispersion. The dispersion can also be mixed with a dispersion of virgin PFSA ionomer as described. Suitably, the dispersion comprises up to 100% of recovered PFSA ionomer, suitably 40% wt/wt recovered PFSA ionomer and more suitably up to 25% wt/wt of recovered ionomer. The catalyst component may be as hereinbefore described in relation to the catalyst coated perfluorosulphonic acid membrane. The ink is prepared using conventional methods known to those skilled in the art, for example, the catalyst component, the dispersion comprising recovered PFSA ionomer and optionally a dispersion of virgin PFSA ionomer, any other components required and any additional solvent required, are combined and if required, particle break-up is carried out by methods known in the art, such as high shear mixing, milling, ball milling, passing through a microfluidiser etc. or a combination thereof, to achieve uniformity of particle size.

The dispersion obtained from the process of the invention can be further processed prior to preparing the proton conducting membrane or catalyst ink. Such further processing may be required to change the nature of the solvent. The further processing can be accomplished by a number of techniques, such as:

(i) Distilling or spray-drying the recycled ionomer dispersion to remove all traces of the diol solvent, to leave behind a dry PFSA solid material, that could then be re-dispersed just prior to membrane or catalyst layer manufacture in the desired solvent mixture.

(ii) Adding a co-solvent which is soluble in, or miscible with, the diol, such as water or a $C_{1-4}$ alcohol, for example ethanol or propan-1-ol, or a mixture of more than one solvent, such as water and propan-1-ol.

(iii) Replacing the diol with a lower boiling point solvent using a solvent extraction process. This might be a suitable alcohol that is immiscible with the diol and which would suspend PFSA. It would need to have an appropriate partition coefficient for PFSA between the two solvent materials to allow a liquid/liquid separation.

(iv) Generating a completely aqueous form of the recycled PFSA ionomer solution by selectively removing the diol. For example, using a pervaporation technique with a suitable separation membrane capable of preferentially removing the diol through the separation membrane leaving behind the recycled ionomer in aqueous form and generating a vapour phase diol stream that could be recovered and recycled for further PFSA membrane dispersion.

The invention further provides a process of separating the perfluorosulphonic acid membrane and the one or more gas diffusion layers in a MEA without proceeding to full dispersion of the perfluorosulphonic acid ionomer in the solvent. Such a process comprises:

(i) immersing the membrane electrode assembly in a solvent comprising a $C_{1-8}$ diol compound, wherein said diol compound comprises at least one —$CH_2OH$ group; and (ii) subjecting the membrane electrode assembly/solvent mix to a temperature of up to 230° C. to effect separation of the membrane electrode assembly components.

All additional limitations detailed above in relation to the process for the recovery of perfluorosulphonic acid ionomer are also applicable to this process.

In one embodiment, at least some of the catalyst component present in the MEA remains on the gas diffusion layer.

Alternatively, at least some of the catalyst component present in the MEA remains on the perfluorosulphonic acid membrane.

The invention further provides a process for the recovery of one or more catalyst components from an original component comprising the one or more catalyst components and one or more PFSA ionomers, the original component being selected from the group consisting of a PFSA membrane, a CCM, electrode and MEA, wherein the fluorine content in the recovered one or more catalyst components is significantly lower than the fluorine content in the original component, and suitably in which the fluorine content is reduced by over 90%, and even more suitably by over 95% compared to the fluorine content in the original component. The one or more catalyst components originally may be present in the PFSA membrane, or in the catalyst layer of a CCM, MEA or electrode, or in both the PFSA membrane and the catalyst layer. The process comprises (i) immersing the original component in a solvent comprising a $C_{1-8}$ aliphatic diol compound, wherein said diol compound comprises at least one —$CH_2OH$ group; (ii) heating the component/solvent mix to a temperature of up to 230° C. to obtain a dispersion comprising solvent, the one or more PFSA ionomers and the one or more catalyst components; and (iii) filtering the dispersion to separate the solvent and the one or more PFSA ionomers from the one or more catalyst components. Immersion of the original component in the solvent and heating will result in the one or more catalyst components becoming dispersed in the solvent; the one or more catalyst components are subsequently filtered off using conventional techniques. The filtered solid comprising the one or more catalyst components can then be further processed to recover the catalyst metal in a straightforward, economic and environmentally acceptable manner.

The invention will now be described further with reference to the following examples which are illustrative and not limiting of the invention.

EXAMPLE 1

Membrane Dispersion

A sample of an unused e-PTFE reinforced 790 EW PFSA membrane (thickness 17 μm) was placed in 20 cm³ of a range of aliphatic diol solvents for 5 hours and the mixture heated to varying temperatures, essentially at zero applied pressure. The initial mass and the final mass of the remaining solid material were measured and the percentage membrane dispersion calculated. The results are shown in Table 1.

TABLE 1

| Solvent | Temperature (° C.) | Initial mass of membrane sample (mg) | Final mass of membrane sample (mg) | Membrane dispersion into solution (%) |
|---|---|---|---|---|
| Ethylene glycol | 120 | 20 | 4 | 80 |
| Propylene glycol | 90 | 20 | 3 | 85 |
| 1,2-butanediol | 90 | 21 | 4 | 81 |
| 1,3-propanediol | 90 | 20 | 15 | 25 |
|  | 120 | 20 | 5 | 75 |
| 1,4-butanediol | 90 | 20 | 18 | 10 |
| 1,5-pentanediol | 90 | 20 | 13 | 35 |
|  | 120 | 20 | 3 | 85 |

It should be noted that the PFSA membranes comprise an e-PTFE reinforcement which does not dissolve in the solvent and which accounts for around 15% by weight of the original membrane sample. Thus this limits the maximum possible dispersion in these trials to around 85%. It can be seen that all of the diol solvents selected were effective in enabling a very high proportion of the PFSA ionomer in the membrane to become dispersed into solution, and in some cases 100% PFSA dispersion was achieved. All trials were performed at temperatures well below the boiling points of the solvents, and therefore were able to be performed at ambient pressures. In the trials using propylene glycol and 1,5-pentanediol solvents, these were also performed at temperatures below the flash point of the solvents.

EXAMPLE 2

Effect of Temperature and Time on Dispersion of Membrane

Samples of an unused e-PTFE-reinforced PFSA membrane (30 μm thickness, 790 EW) were weighed. The initial mass includes the weight of the e-PTFE reinforcement which accounts for approximately 7% of the total weight of the membrane.

The samples were placed in 35 cm³ of ethylene glycol solvent and heated to temperatures of 90° C., 120° C. and 150° C. for times varying from 1-5 hours. The final mass of the remaining solid material was measured and the percentage membrane dispersion into solution calculated.

The results are shown in Table 2.

TABLE 2

| Temperature (° C.) | Duration (hours) | Initial mass (g) | Final mass (g) | Mass loss (g) | Membrane dispersion into solution (%) |
|---|---|---|---|---|---|
| 90 | 1 | 0.1664 | 0.0451 | 0.1213 | 73 |
|  | 2 | 0.1740 | 0.0344 | 0.1396 | 80 |
|  | 3 | 0.2127 | 0.0180 | 0.1947 | 92 |
|  | 4 | 0.1878 | 0.0178 | 0.1700 | 91 |
| 120 | 1 | 0.1848 | 0.0155 | 0.1693 | 92 |
|  | 2 | 0.1914 | 0.0135 | 0.1779 | 93 |
|  | 3 | 0.1931 | 0.0172 | 0.1759 | 91 |
|  | 4 | 0.1177 | 0.0126 | 0.1051 | 89 |
|  | 5 | 0.1942 | 0.0171 | 0.1771 | 91 |
| 150 | 1 | 0.1857 | 0.0151 | 0.1706 | 92 |
|  | 2 | 0.1880 | 0.0149 | 0.1731 | 92 |
|  | 3 | 0.1870 | 0.0148 | 0.1722 | 92 |
|  | 4 | 0.1102 | 0.0085 | 0.1017 | 92 |
|  | 5 | 0.1866 | 0.0153 | 0.1713 | 92 |

As can be seen from Table 2, the effect of increasing dispersion time is quite significant at a temperature of 90° C., but has little (or no) effect at 120° C. and 150° C., where the amount of ionomer dispersed into solution is close to 100% even after just one hour of treatment in the ethylene glycol solvent. The e-PTFE reinforcement does not dissolve in the ethylene glycol and accounts for the fact that a maximum of approximately 93% of the overall membrane is recoverable.

EXAMPLE 3

Structural Analysis of Dispersed Ionomer

19 F solid state NMR spectroscopy was carried out on a sample of an "as received" 920 EW PFSA membrane and on a sample of the ionomer dispersed in ethylene glycol solvent following dispersion tests performed on the membrane as described in the inventive process. A sample of the membrane (11.4 g) was heated in ethylene glycol (60 cm³) at 150° C. for 6 hours. The two spectra are shown in FIG. 1. The results indicate the presence of $SCF_2$, $(CF_2)_n$ and main CF groups in similar ratios and demonstrate that the dispersion process of the invention to recover the ionomer from the original membrane has not significantly affected the chemical structure of the PFSA ionomer.

EXAMPLE 4

MEA Separation and Component Recovery

Small samples were cut from the centre of various unused and tested (used) MEA samples (all having a PFSA membrane) of known PFSA ionomer and Pt content. The MEA samples all comprised membrane, catalyst layers and GDLs, but not any of the peripheral edge seals and gaskets. The samples were sandwiched between two pieces of PTFE mesh and immersed in a predetermined quantity of ethylene glycol. A summary of the samples is provided in Table 3.

TABLE 3

| | Used/Unused | Reinforcement | EW of membrane ionomer (geq$^{-1}$) | Thickness of membrane (μm) | Mass of MEA (g) | Volume of ethylene glycol (cm$^3$) |
|---|---|---|---|---|---|---|
| Sample A | Unused | e-PTFE | 920 | 17 | 23.2 | 20 |
| Sample B | Unused | None | 1100 | 125 | 10.8 | 20 |
| Sample C | Used (3000 hours) | e-PTFE | 920 | 30 | 21.9 | 27 |
| Sample D | Used (3000 hours) | e-PTFE | 790 | 17 | 16.3 | 28 |
| Sample E | Used (3000 hours) | None | 1100 | 125 | 7.6 | 20 |

The MEA samples were heated to a temperature of 150° C. for 4 hours, without the use of any applied pressure.

On immersion of the MEA samples into the ethylene glycol solvent, it was observed that initially separation of the MEA components started to occur after a very short immersion time. For some MEAs a full separation of the MEA into component parts was observed to occur within the first hour of the dispersion process. Depending on the nature of the MEA, the separation involved the GDL and catalyst layer detaching from the PFSA membrane, or the GDL detaching from the catalyst layer and membrane. As the immersion time progressed the PFSA ionomer component of the membrane gradually dispersed into the ethylene glycol solution, and also the carbon particulate component, including the platinum nanoparticles supported on the carbon particulates, also dispersed into the solution. For Samples A, C and D, which were representative of state of the art PEMFC MEAs, it was observed that full dispersion of the membrane component had occurred within the four hours, with no solid membrane remaining visible. For Samples B and E, which were representative of state of the art DMFC MEAs, some dispersion of the membrane had occurred, but the process was incomplete. These samples were heated for a further 68 hours at 150° C., and although the ionomer dispersion from the membrane increased, it was still incomplete after this time.

On completion of the dispersion trials at the elevated temperature, the resulting mixture comprising the dispersion of PFSA ionomer particles and carbon (including Pt/C) particles and residual solids was cooled to room temperature. The residual solids (essentially the gas diffusion layers, e-PTFE and any remaining non-dispersed PFSA for Samples B and E) were removed from the mixture, to leave a dispersion comprising the PFSA ionomer in the ethylene glycol and the carbon and platinum/carbon catalyst particles in suspension. The residual solids were washed, dried and analysed for residual PFSA and Pt content.

The carbon and Pt/C particles were separated from the ionomer dispersion in the ethylene glycol by vacuum filtration, to leave a clear and colourless filtrate containing the recovered PFSA ionomer. The filtrates and solids were analysed for sulphur, fluorine and platinum content by ICP analysis. From the sulphur analysis the amount of PFSA ionomer contained in the filtrate compared with that in the original MEA was determined.

The process of the invention was highly efficient in dispersion of the PFSA ionomer from the PEMFC MEAs, but was also partially successful in recovering a proportion of the ionomer from the DMFC MEAs. In the DMFC MEAs, the membrane comprised a much higher 1100 EW PFSA ionomer and was of a greater thickness compared to the PEMFC MEAs, thus although the process of the invention is particularly suitable for recovery of ionomer from the PEMFC MEAs, it is also possible to use it for higher EW ionomers, as typically used in DMFC MEAs, although higher temperature and longer duration dispersion processes may be required.

The solids isolated from the filtering of the ethylene glycol dispersion were analysed for Pt content. In the trials where the component separation and the subsequent carbon particulate dispersion into the solution progressed to a high level of completion, the majority of the Pt content of the MEA (>95%) was captured in this process outlet stream. The amount of fluorine in the Pt rich outlet stream was typically greater than 90% lower than that contained in the original MEA.

EXAMPLE 5

Reformulation and Membrane Manufacture

A dispersion of recovered PFSA ionomer of 790 EW in ethylene glycol was used to prepare cast membranes. The recovered ionomer was blended with virgin ionomer dispersion of the same ionomer (i.e. type and equivalent weight) in a dispersion of water and propan-1-ol. Blends of 10 and 20% w/w of ionomer were evaluated.

Comparative Membrane 1

An as-received (virgin) dispersion of 790 EW PFSA ionomer in water at 25 wt % ionomer solids content was diluted with propan-1-ol (69.9% ionomer dispersion to 30.1% propan-1-ol) to achieve a solids content of 17.4 wt %. A membrane was prepared by casting multiple wet layers of the ionomer using a Meyer bar application method which were dried between deposition steps to build up the final membrane thickness. One of the intermediate layers contained an e-PTFE polymer reinforcing component. The e-PTFE was fully impregnated by the PFSA ionomer to form the reinforced membrane material. The final membrane was dried and then annealed at 180° C.

Example Membrane 1

A sample of recovered 790 EW ionomer in ethylene glycol was produced from a 790 EW membrane using the process of the invention. This dispersion, measured as 17 wt % ionomer solids, was mixed with a virgin 790 EW PFSA dispersion in water and propan-1-ol, prepared as described in Comparative Membrane 1, in the weight ratio of 10 wt % recovered ionomer dispersion, 62.91 wt % virgin ionomer dispersion in water, and 27.09 wt % propan-1-ol. The blended ionomer mixture was simply mixed by stirring the two ionomer dispersions together at ambient temperature and pressure. The final blended ionomer mixture had an ionomer solids content of 17.4 wt % and a content of recovered ionomer to the overall blended ionomer of 10 w/w % of recovered ionomer material. A membrane was fabricated from the blended ionomer, as described in Comparative Membrane 1.

Example Membrane 2

Example 2 Membrane was fabricated in the same manner as Example Membrane 1, with the exception that recovered ionomer dispersion, was mixed with the virgin 790 EW PFSA dispersion in water and propan-1-ol in the ratios of 20 wt % recovered ionomer dispersion, 55.92 wt % virgin ionomer dispersion in water and 24.08 wt % propan-1-ol. The final blended ionomer mixture had an ionomer solids content of 17.4 wt % and a content of recovered ionomer to the overall blended ionomer of 20 w/w % of recovered ionomer material. A membrane was fabricated from the blended ionomer, as described in Comparative Membrane 1.

Example Membranes 1 and 2 were characterised and compared to a conventional Comparative Membrane 1 made from 100% virgin PFSA ionomer dispersion. The Example Membranes 1 and 2 all exhibited a comparable visual appearance to the Comparative Membrane 1 and the same average thickness and reinforcement impregnation capability.

The tensile strength characteristics of the membranes were also determined. The results are shown in Table 4.

TABLE 4

| | Blend % | Average thickness (μm) | Ultimate tensile strength (MPa) MD[1] | Ultimate tensile strength (MPa) TD[2] |
|---|---|---|---|---|
| Comparative Membrane 1 | n/a | 15 | 20 | 29 |
| Example Membrane 1 | 10 | 16 | 25 | 24 |
| Example Membrane 2 | 20 | 17 | 16 | 22 |

[1]Machine direction
[2]Transverse direction

The tensile strength of the blended membranes comprising recovered ionomer, although variable, was similar to the 100% virgin PFSA ionomer based membrane.

EXAMPLE 6

Membrane Electrode Assembly Cell Testing

Example Membranes 1 and 2 and Comparative Membrane 1 were fabricated into 50 cm$^2$ CCMs by applying anode and cathode catalyst layers to the membranes by the decal transfer process. The same anode and cathode ink formulations were used for all CCMs and resulted in CCMs with nominal Pt loadings of 0.2 mg/cm$^2$ and 0.6 mg/cm$^2$ respectively. The same lamination conditions of temperature, pressure and timing were employed to bond the catalyst layers to the membranes for each CCM. No issues were observed during fabrication when using the membranes fabricated from the blend of recovered and virgin ionomer. MEA fabrication was completed by applying the same GDLs to each side of the CCM prior to inserting into the single fuel cell for testing. Each MEA was tested for beginning of life (BOL) polarisation (current vs voltage) performance (using standard protocols and conditions) and in-situ resistance measurement. FIG. 2 clearly demonstrates that the BOL performance of MEAs in which the membrane comprised 10% and 20% of recycled ionomer was essentially equivalent to the conventional MEA in which the membrane was comprised entirely of new ionomer material.

The invention claimed is:

1. A process for the recovery of perfluorosulphonic acid ionomer from a component comprising a perfluorosulphonic acid ionomer, wherein the component comprising a perfluorosulphonic acid ionomer is selected from the group consisting of
   a perfluorosulphonic acid ionomer composite membrane wherein the composite membrane contains materials that confer mechanical strength,
   a perfluorosulphonic acid ionomer membrane wherein the membrane comprises a recombination catalyst,
   a perfluorosulphonic acid ionomer membrane wherein the membrane comprises a hydrogen peroxide decomposition catalyst,
   a catalyst coated membrane,
   a membrane electrode assembly,
   and,
   an electrode,
   said process comprising the steps of:
   (i) immersing the component comprising a perfluorosulphonic acid ionomer in a solvent consisting of a $C_{1-8}$ aliphatic diol compound and optionally a co-solvent that is miscible with the $C_{1-8}$ aliphatic diol compound, wherein said diol compound comprises at least one —CH$_2$OH group;
   and
   (ii) heating the component/solvent mix to a temperature of 90° C. to 150° C., wherein the temperature is below the boiling point of the solvent, to obtain a dispersion comprising solvent and perfluorosulphonic acid ionomer.

2. The process according to claim 1, wherein the component comprising a perfluorosulphonic acid ionomer is chopped or shredded prior to being immersed in the solvent.

3. The process according to claim 1, wherein the solvent includes the co-solvent.

4. The process according to claim 3, wherein the co-solvent is water.

5. The process according to claim 3, wherein the co-solvent is a $C_{1-4}$ alcohol.

6. The process according to claim 3, wherein the co-solvent is a mixture of water and propan-1-ol.

7. The process according to claim 1, said process further comprises a step
   (iii) immersion of additional component comprising perfluorosulphonic acid ionomer in the dispersion obtained in step (ii) and subjecting the membrane/solvent mix to a temperature of 90° C. to 150° C., wherein the temperature is below the boiling point of the solvent.

8. The process according to claim 7, said process comprising heating the component/solvent mix to a temperature of 90° C. to 120° C.

9. The process according to claim 1, said process comprising heating the component/solvent mix to a temperature of 90° C. to 120° C.

* * * * *